Oct. 10 1933.            G. WIGGINS ET AL            1,930,218
                            GUARDED FRUIT BOX
                          Filed Sept. 30, 1932

Inventors:
Gaynor Wiggins
and Howard Phillips,
by A. W. Harrison
Att'y.

Patented Oct. 10, 1933

1,930,218

UNITED STATES PATENT OFFICE 1,930,218

GUARDED FRUIT BOX

Gaynor Wiggins and Howard Phillips, Orlando, Fla., assignors to Dr. P. Phillips Company, Orlando, Fla., a corporation of Florida Application September 30, 1932
Serial No. 635,647

6 Claims. (Cl. 217—3)

This invention relates to containers employed for the shipment or storage of produce such as citrus fruit which is usually so packed that some of the produce projects above the top of the box or crate and creates what is known as a bulge.

When the cover or lid is pressed down on the over-full box, preparatory to and during the securing of the cover or lid in place, as by nails, the fruit is often damaged by pressure against and movement past the upper edges of the walls of the box or crate.

Various attempts have been made to protect the fruit from damage during such packaging operations, but so far as we are aware, the material employed to effect such protection has been either unduly difficult to locate correctly, or expensive to produce, or both.

One of the objects of the present invention is to provide guards for such bulging produce as referred to, which guards are easily manipulated and located in proper positions in the box or crate.

Another object is to provide, for the purpose explained, guards which are producible at a minimum of cost.

With such objects in view, our invention consists in the construction of the guards, and the combination thereof with boxes or crates, substantially as hereinafter described and claimed.

Of the accompanying drawing.

Similar reference characters indicate similar parts or features in all of the views.

The particular type of box chosen for illustration but without limiting ourselves thereto, comprises side wall strips 12, end walls 13, and a partition 14 at the mid-length of the box. In this type, the end walls 13 include wood margin strips 15.

Figure 1:
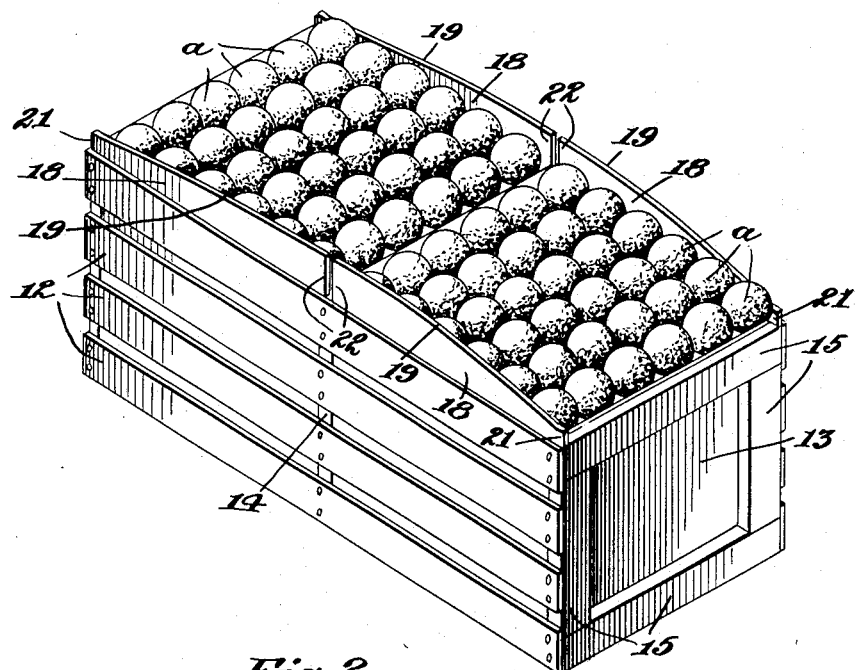
Figure 1 is a perspective view of a well-known type of filled fruit boxes, omitting the usual lid or cover and with our improved guards in place.
Figure 2:
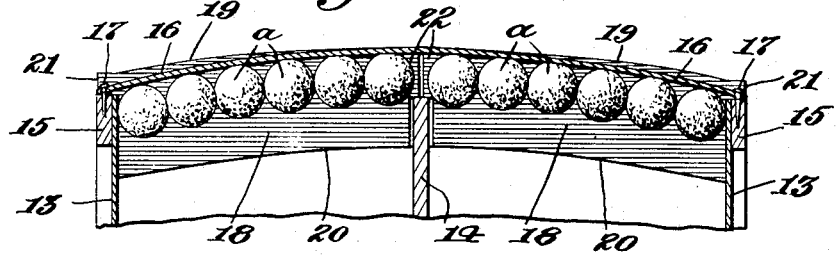
Figure 2 represents a longitudinal section of the upper portion of the same, but with the lid or cover in place.
Figure 3:
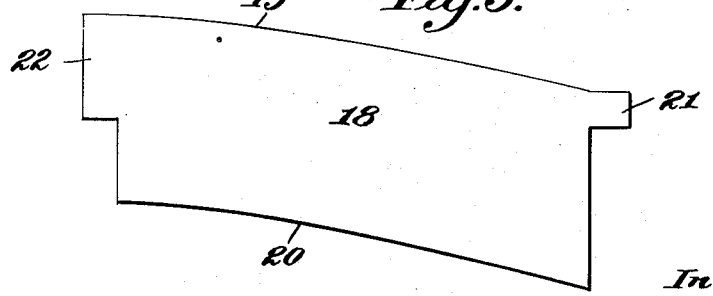
Figure 3 is a side elevation of one of the four guards employed.

When such a box is being packed with produce such as citrus fruit illustrated at a, it is customary to so fill the box that the upper layer projects above the level of the top of the box. To protect those fruits which are along the margins of the top layer from being damaged by contact with the upper edges of the side walls when the lid or cover strips 16 are pressed down prior to having their ends secured as by nails 17, we provide our improvement consisting of four duplicate guard strips such as best shown in Figure 3.

Each guard strip 18, which may consist of paper board or other suitable sheet material, has a curved upper edge 19, the purpose of which will be presently described, and a correspondingly curved lower edge 20, the reason for such curvature of the lower edge being for the sake of economy in production.

Each guard strip has, at one end, a small extension or lug 21, and at the other end has an extension 22 which is of greater vertical length than the lug 21.

The operation or use of the invention is as follows:—

When a box or crate is filled with fruit in the usual manner, with the upper layer projecting above the upper edges of the box, four of the guards are tucked in beside the outer rows of the top layer to a correct distance determined by the small extensions 21 contacting with the top strips 15 of the end walls of the box, and the large extensions 22 contacting with the top of the partition 15. As the upper edges of the guards are curved as illustrated, no portions thereof project unduly above the top surface of the cover or lid 16 when the latter is nailed down. In other words, the upper edges of the guards conform approximately to the curvature of the top of the complete closed box when the latter is packed so as to have the customary bulge.

The reason for providing the guards with extensions 22 having a greater vertical length than the extensions 21, is to ensure the guards, when inserted, reaching and maintaining a pre-determined position for performing their functions when a box is packed with the customary bulge of fruit.

During the nailing down of the ends of the cover or lid, the guards 18 protect the side rows of the top layer of fruit from being bruised by contact with the upper edges of the side walls 12. There is no need for such protection between the end rows of the top layer and the end strips 15 because during the pressing down and nailing of the ends of the cover 16, if any fruit is too close to a strip 15 it is easy for the operator to push such fruit back.

Having now described our invention, we claim:

1. Means for protecting fruit packed in a box, said means comprising independent duplicate guard strips, each of said strips having end extensions one of which is of greater vertical length than the other.

2. The combination with a box of fruit, said box having an intermediate partition, of four independent duplicate guard strips inserted in pairs between the side rows of the fruit and the upper edges of the side walls of the box, one pair at each side of the partition, each of said strips having a small end extension bearing on the top of an end wall of the box and a larger extension bearing on the top of the said partition.

3. Means for protecting fruit packed in a box, said means comprising four independent duplicate uniformly flat guard strips proportioned to individually fit four separate side areas of a box, each of said strips being provided at its extremities with supporting means, said supporting means being so positioned as to cause the strips to be inclined relatively to the horizontal top edges of the sides of the box.

4. Means for protecting fruit packed in a box, said means comprising four independent duplicate uniformly flat guard strips proportioned to individually fit four separate side areas of a box, each of said strips having means for maintaining one end higher than the other end when installed in a box.

5. Means for protecting fruit packed in a box, said means comprising four independent duplicate uniformly flat guard strips proportioned to individually fit four separate side areas of a box, each of said strips having recessed ends providing shoulders to contact with upper edge portions of a box, said shoulders being relatively located to hold each strip in the box with one end higher than the other end.

6. The combination with a box of fruit, of four independent substantially duplicate uniformly flat guard strips inserted between the side rows of the top layer of fruit and the upper edges of the side walls of the box, each of said strips being provided at its extremities with supporting means, said supporting means being so positioned as to cause the strips to be inclined relatively to the horizontal top edges of the box.

GAYNOR WIGGINS.
HOWARD PHILLIPS.